United States Patent
Chantz

(10) Patent No.: US 12,008,909 B2
(45) Date of Patent: Jun. 11, 2024

(54) DATA ANALYSIS OF DRONE AND AVIATION AIRSPACE FOR GENERATING DRONE FLIGHT PATH

(71) Applicant: International Business Machines Corporation, Armonk, NY (US)

(72) Inventor: Hyman David Chantz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 461 days.

(21) Appl. No.: 16/940,302

(22) Filed: Jul. 27, 2020

(65) Prior Publication Data

US 2022/0028282 A1  Jan. 27, 2022

(51) Int. Cl.
G08G 5/00 (2006.01)
B64C 39/02 (2023.01)
B64U 101/00 (2023.01)

(52) U.S. Cl.
CPC ......... *G08G 5/0034* (2013.01); *B64C 39/024* (2013.01); *G08G 5/0013* (2013.01); *G08G 5/006* (2013.01); *B64U 2101/00* (2023.01)

(58) Field of Classification Search
CPC .... G08G 5/0034; G08G 5/0013; G08G 5/006; G08G 5/003; G08G 5/0047; G08G 5/0069; G08G 5/0026; G08G 5/0052; G08G 5/02; B64C 39/024; B64C 2201/12; B64U 2101/00; B64U 2201/10; B64U 2201/20; B60L 2200/10
See application file for complete search history.

(56) References Cited

U.S. PATENT DOCUMENTS 8,576,123 B2  11/2013  Chantz
9,412,278 B1 *  8/2016  Gong ................... G08G 5/0039
                                                          701/2

(Continued)

OTHER PUBLICATIONS

"14 CFR Part 107—Small Unmanned Aircraft Systems", Legal Information Institute, Cornell Law School, last printed Mar. 9, 2020, 1 page, <https://www.law.cornell.edu/cfr/text/14/part-107>.

(Continued)

*Primary Examiner* — Russell Frejd
*Assistant Examiner* — Brandon Z Willis
(74) *Attorney, Agent, or Firm* — Michael A. Petrocelli

(57) ABSTRACT

Data regarding possible flight paths for a drone in relation to a start location and a destination is analyzed using a computer. Air space accessibility over a plurality of properties is determined, as part of a criteria, and the air space accessibility includes property owner permission and authorization for drone flight paths over the properties, respectively. Legal regulations regarding the possible drone flight paths over locations including the plurality of properties is determined as part of the criteria. An approved flight path is generated which includes permissions for the flight path granted by the property owners for flying through respective air space over the respective properties, and meeting legal regulations for flying over the locations including the respective properties on the possible flight paths. The approved flight path is sent to the drone or a drone control system for initiating a flight of the drone along the approved flight path.

17 Claims, 10 Drawing Sheets

(56) References Cited

U.S. PATENT DOCUMENTS

| | | | |
|---|---|---|---|
| 10,181,152 B1* | 1/2019 | Rao | G06Q 10/08 |
| 10,297,160 B1* | 5/2019 | O'Leary | G08G 5/0034 |
| 10,479,528 B1 | 11/2019 | Liang | |
| 2015/0254988 A1* | 9/2015 | Wang | G08G 5/006 |
| 2016/0307449 A1 | 10/2016 | Gordon | |
| 2017/0015415 A1* | 1/2017 | Chan | B64C 39/024 |
| 2017/0278404 A1 | 9/2017 | Gordon | |
| 2017/0344000 A1 | 11/2017 | Krishnamoorthy | |
| 2018/0046201 A1 | 2/2018 | Erickson | |
| 2018/0186473 A1 | 7/2018 | Erickson | |
| 2018/0270244 A1 | 9/2018 | Kumar | |
| 2020/0317334 A1* | 10/2020 | Skeba | B64C 39/024 |

OTHER PUBLICATIONS

"AERO: Enabling the Drone Superhighway Using the Blockchain", Hackernoon, Sep. 24, 2017, 4 pages, <https://hackernoon.com/aero-token-enabling-the-drone-superhighway-using-the-blockchain-ce2cf5004a10>.

"FAA Drone Registry Tops One Million", US Department of Transportation, Wednesday, Jan. 10, 2018, 2 pages, <https://www.transportation.gov/briefing-room/faa-drone-registry-tops-one-million>.

"Part 107 Waivers", Federal Aviation Administration, Last modified Aug. 1, 2019, 3 pages, <https://www.faa.gov/uas/commercial_operators/part_107_waivers/>.

"Drones power charging system", An IP.com Prior Art Database Technical Disclosure, Disclosed Anonymously, IP.com No. IPCOM000248581D,IP.com Electronic Publication Date: Dec. 20, 2016, 6 pages.

"How To Get Drone Flights Approved in Controlled Airspace with Laanc", Drone Pilot Ground School, Jul. 25, 2019, <https://www.dronepilotgroundschool.com/faa-laanc-authorization/>.

Chantz, Hy, "Using Blockchain to Address Drone Cybersecurity", Security Intelligence, Aug. 25, 2016, 5 pages, <https://securityintelligence.com/using-blockchain-to-address-drone-cybersecurity/>.

Chantz, Hy, "Weather wither whether: How blockchain enables precision agriculture", Blockchain Pulse: IBM Blockchain Blog, May 30, 2018, 2 pages, <https://www.IBM.com/blogs/blockchain/2018/05/weather-wither-whether-how-blockchain-enables-precision-agriculture/>.

Liptak, Andrew, "The FAA says the commercial drone market could triple in size by 2023", The Verge, May 4, 2019, 2 pages, <https://www.theverge.com/2019/5/4/18529241/faa-annual-aviation-report-hobby-commercial-drones-prediction-2023>.

Mell et al., "The NIST Definition of Cloud Computing", National Institute of Standards and Technology, Special Publication 800-145, Sep. 2011, 7 pages.

* cited by examiner

DATA ANALYSIS OF DRONE AND AVIATION AIRSPACE FOR GENERATING DRONE FLIGHT PATH

BACKGROUND

The present disclosure relates to data analysis of drone aviation airspace for regulations and consent of landowners for generating a drone flight path through airspace.

Electric aircraft, both piloted and autonomous, including small and larger aerial vehicles offer platforms for machine tasks such as package delivery, package pickup, remote sensing, agricultural seeding and support, photography, medical support, communications relay and many other uses. The use of drones can be limited in many countries by airspace regulations, by property and privacy issues, and by safety concerns. For example, in the U.S.A., drone use can be covered by Federal Air Regulations under the Federal Aviation Administration (FAA), which typically include limits of altitude (for example, not to exceed 400 feet above ground level), overflight restrictions, continual personal light-of-sight control and many other criteria.

However, while drones are generally precluded by FAA regulation above 400 feet, flight below 400 feet is allowed, however, such flight may be over private property and can be precluded by property and privacy rights of the landowner. Thus, unless a user is flying above their own property, or in publicly allowed airspace, individual permissions, that is, permission from landowners may be required, and thus can results in a complex patchwork of land use permission for a flight. In one example, regulations can include a requirement that a drone must be under direct line-of-sight control, or have other requirements, although, in some instances, waivers may be given in certain circumstances. Other requirement can include a drone having identifying serial numbers associating them with owners. Thereby, facts and issues for consideration can include regulations, legal requirements, private property rights, and privacy rights when flying a drone. Such facts and issues can be confusing, complex, result in legal ramifications, such as fines, and generally can be confusing, time consuming, and burdensome for a user flying a drone.

SUMMARY

The present disclosure recognizes the shortcomings and problems associated with current systems for determining a flight path of a drone over private property, such as many pieces or parcels of private property.

The present invention describes a dynamic, cooperative, database of authorization information for drone and other aircraft low overflights. Authorizations can be based on an identity of the drone, as well as the landowner's permission for an overflight. The landowner may specify such items as time-of-day permissions and restriction, weekend, holiday or religious observance restrictions, type of material carried, size of drone, noise signature, altitude, etc.

The present invention can include an auction market by path authorization if required, including both single-threaded and complex. Modern drones can have high-bandwidth two-way communications, for example, in the 2.4 or 5.8 GHz (gigahertz) bands. The present invention can include, for instance, via cloud computing, determining regulations, for example using a centralized database, or via a blockchain wherein the blocks are typically assertions of the potentially overflown landowner properties. Further, a database can include smart contracts which include go/no-go transactional database information for drones or Low Altitude Aircraft.

The present invention can use a dynamic database, authorization information, and billing for overflights of private property, with systematized technological oversight. In some instances, drones can be restricted or geofenced to preclude operation over specified areas or places, such as sports stadiums, airports etc., due to safety concerns. However, the present invention includes a permission system which can be used for commercial purposed, revenue generation, as well as statistical uses. Such enterprising endeavors can take the form of granting permissions, trading services, exchanges, reciprocating permits, and monetizing overflight access by drones or other low-flying vehicles, by property owners of their personal low airspace associated with their property.

In an aspect according to the present invention, a method, using a computer, for determining a flight path of a drone includes analyzing, using the computer, data regarding possible flight paths for a drone in relation to a start location and a destination, in response to receiving, at the computer, a request for a flight path for the drone including the start location and the destination, the data analysis using criteria for the possible drone flight paths. The method includes determining air space accessibility over a plurality of properties, as part of the criteria, the property air space accessibility including property owner permission and authorization for the possible drone flight paths over the properties, respectively. The method further includes determining legal regulations regarding the possible drone flight paths over locations including the plurality of properties, as part of the criteria. The data regarding the possible flight paths based on the criteria is analyzed to ascertain when permissions for the possible flight paths are granted including the permissions of the property owners for flying through respective air space over the respective properties on the flight path, and when the legal regulations are met for flying over the locations including the respective properties on the possible flight paths. The method includes generating an approved flight path for the drone of the possible flight paths based on the analysis of the data, the approved flight path meeting the criteria, and sending the approved flight path to the drone or a drone control system for initiating a flight of the drone along the approved flight path.

In a related aspect, each of the plurality of properties has a defined parcel of land at a location and having corresponding air space.

In a related aspect, the possible flight paths for the drone are pre-flight, and the pre-flight possible flight paths are generated before the drone starts flying along a flight path.

In a related aspect, the method further includes initiating the flight of the drone, and the drone beginning its flight along the approved flight path.

In a related aspect, the method further includes: using the generated possible flight paths, determining property owners of the properties required for the flight path; contacting the property owners for permission for a flyover of the drone through airspace associated with the properties, respectively; receiving the flyover permissions from the property owners; and using the flyover permissions received from the property owners in the generation of the possible flight paths.

In a related aspect, the method further includes: generating a compensation option for use of the airspace over respective properties of the plurality of properties, the compensation option being in consideration for obtaining FAA (Federal Aviation Administration) waivers.

In a related aspect, the method further includes: using the generated possible flight paths, determine applicable FAA regulations for the locations correlating to the possible flight paths; determining accessibility of the possible flight paths over the locations based on the applicable FAA regulations; and using the accessibility over the location in the generation of the possible flight paths.

In a related aspect, the method further includes: determining, as part of the analysis of when permissions for the possible flight paths are granted, an accessible property of the plurality of properties which allows for recharging the drone; receiving recharging permission from the accessible property; and negotiating compensation for the recharging service for an owner of the accessible property.

In a related aspect, the method further includes: using radio frequency, video, and audio communications for ancillary identification and control of the drone.

In a related aspect, the method further includes: receiving legal regulation data at the computer system, as part of the determining of legal regulation, regarding drone flights and usage, the regulation data including local, State, and Federal regulations and laws regarding drone flights and usage, and also including FAA (Federal Aviation Administration) regulations.

In a related aspect, the method further includes: determining a shortest flight path of the possible drone flight paths; and selecting the shortest flight path of the possible drone flight paths as the approved flight path.

In a related aspect, the method further includes: analyzing the property air space accessibility and the legal regulation data with respect to the start location and the destination to generate possible flight paths for the drone through air space with all legal approvals for traveling through the air space along the flight path, the analysis including, checking that air space permissions for all properties passed over in the possible flight paths are received, and checking regulations by the local, state and federal authorities are met for the possible flight paths; and determining a best flight path based on the analysis and the criteria, the best flight path including a shortest flight path between the start location and the destination, and receiving all flyover permissions from property owners who own the properties and the air space over the properties for the best flight path.

In a related aspect, the method further includes: generating a second approved flight path; receiving a selection from a user of a flight path selected from either the approved flight path or the second approved flight path; and sending the selected flight path to the drone.

In a related aspect, the method further includes: generating another approved flight path in response to additional data being received at the computer, during a flight of the drone on the approved flight path.

In a related aspect, the method further includes: iteratively generating a plurality of approved flight paths in response to a plurality of instances of additional data being received at the computer, respectively, during a flight of the drone on the approved flight path.

In a related aspect, the computer is part of a control system for controlling the drone in flight along the approved flight path.

In a related aspect, the method further includes: negotiating compensation for the traversing by the drone of an air space of a property of the plurality of properties, the negotiating includes; receiving permission for the traversing by the drone of the air space pf the property, in response to sending a communication to an owner or manager of the property; communicating an offer of compensation for the traversing by the drone of the air space of the property; and receiving an acceptance of the offer of compensation from the owner or manager of the property.

In another aspect according to the present invention, a system for determining a flight path of a drone includes a computer system. The computer system includes a computer processor, a computer-readable storage medium, and program instructions stored on the computer-readable storage medium being executable by the processor, to cause the computer system to perform functions, by the computer, comprising, the following functions to: analyze data regarding possible flight paths for a drone in relation to a start location and a destination, in response to receiving, at the computer, a request for a flight path for the drone including the start location and the destination, the data analysis using criteria for the possible drone flight paths; determine air space accessibility over a plurality of properties, as part of the criteria, the property air space accessibility including property owner permission and authorization for the possible drone flight paths over the properties, respectively; determine legal regulations regarding the possible drone flight paths over locations including the plurality of properties, as part of the criteria; analyze the data regarding the possible flight paths based on the criteria to ascertain when permissions for the possible flight paths are granted including the permissions of the property owners for flying through respective air space over the respective properties on the flight path, and when the legal regulations are met for flying over the locations including the respective properties on the possible flight paths; generate an approved flight path for the drone of the possible flight paths based on the analysis of the data, the approved flight path meeting the criteria; and send the approved flight path to the drone or a drone control system for initiating a flight of the drone along the approved flight path.

In a related aspect, each of the plurality of properties having a defined parcel of land at a location and having corresponding air space.

In another aspect according to the present invention, a computer program product for determining a flight path of a drone includes a computer readable storage medium having program instructions embodied therewith. The program instructions are executable by a computer to cause the computer to perform functions, by the computer, comprising the functions to: analyze data regarding possible flight paths for a drone in relation to a start location and a destination, in response to receiving, at the computer, a request for a flight path for the drone including the start location and the destination, the data analysis using criteria for the possible drone flight paths; determine air space accessibility over a plurality of properties, as part of the criteria, the property air space accessibility including property owner permission and authorization for the possible drone flight paths over the properties, respectively; determine legal regulations regarding the possible drone flight paths over locations including the plurality of properties, as part of the criteria; analyze the data regarding the possible flight paths based on the criteria to ascertain when permissions for the possible flight paths are granted including the permissions of the property owners for flying through respective air space over the respective properties on the flight path, and when the legal regulations are met for flying over the locations including the respective properties on the possible flight paths; generate an approved flight path for the drone of the possible flight paths based on the analysis of the data, the approved flight path meeting the criteria; and send the approved flight path to the drone or a drone control system for initiating a flight of the drone along the approved flight path.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
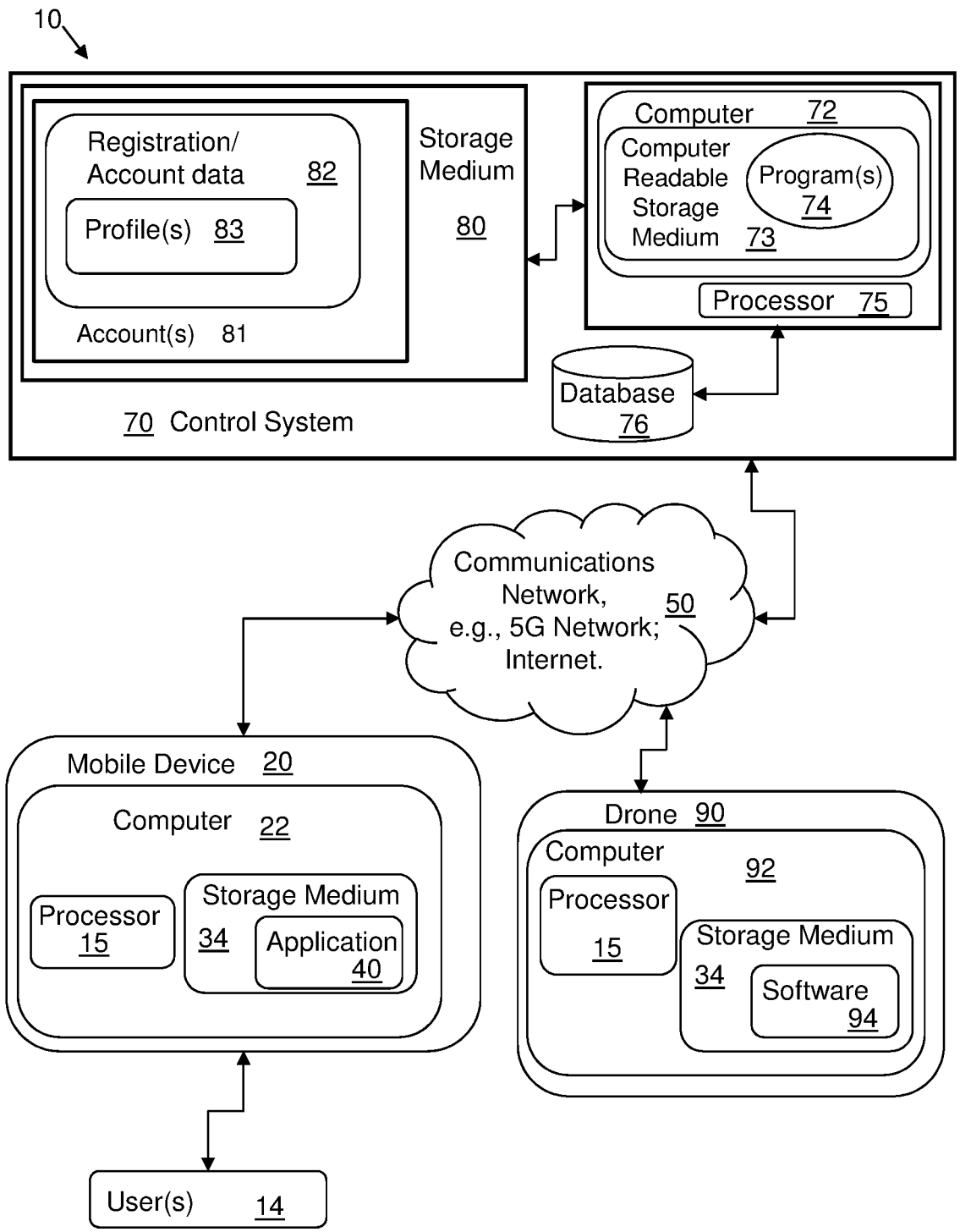
FIG. 1 is a schematic block diagram illustrating an overview of a system and methodology for determining a flight path of a drone, according to an embodiment of the invention.
Figure 2:
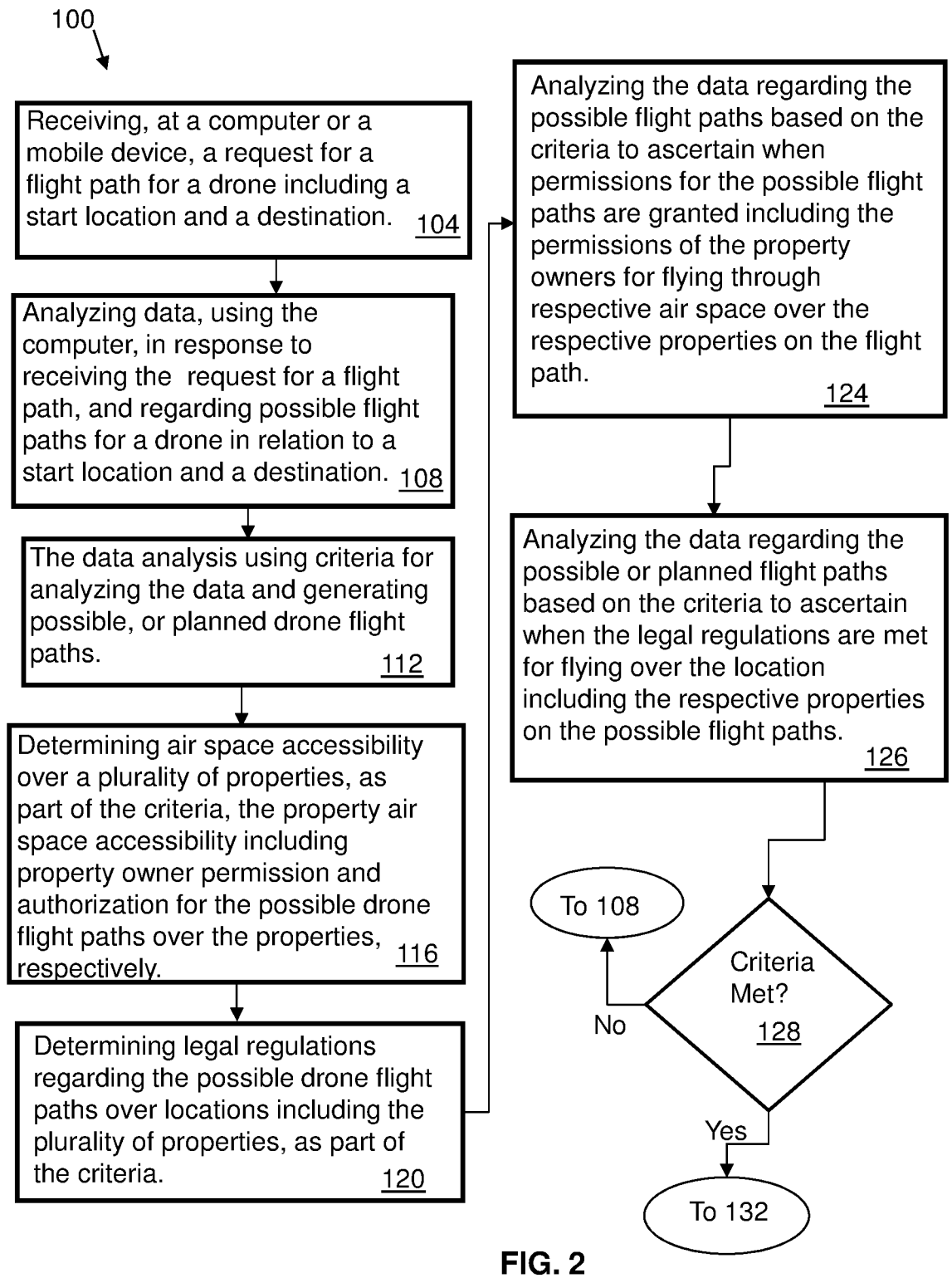
FIG. 2 is a flow chart illustrating a method, implemented using the system shown in FIG. 1, for determining a flight path of a drone, according to an embodiment of the present invention.
Figure 3:
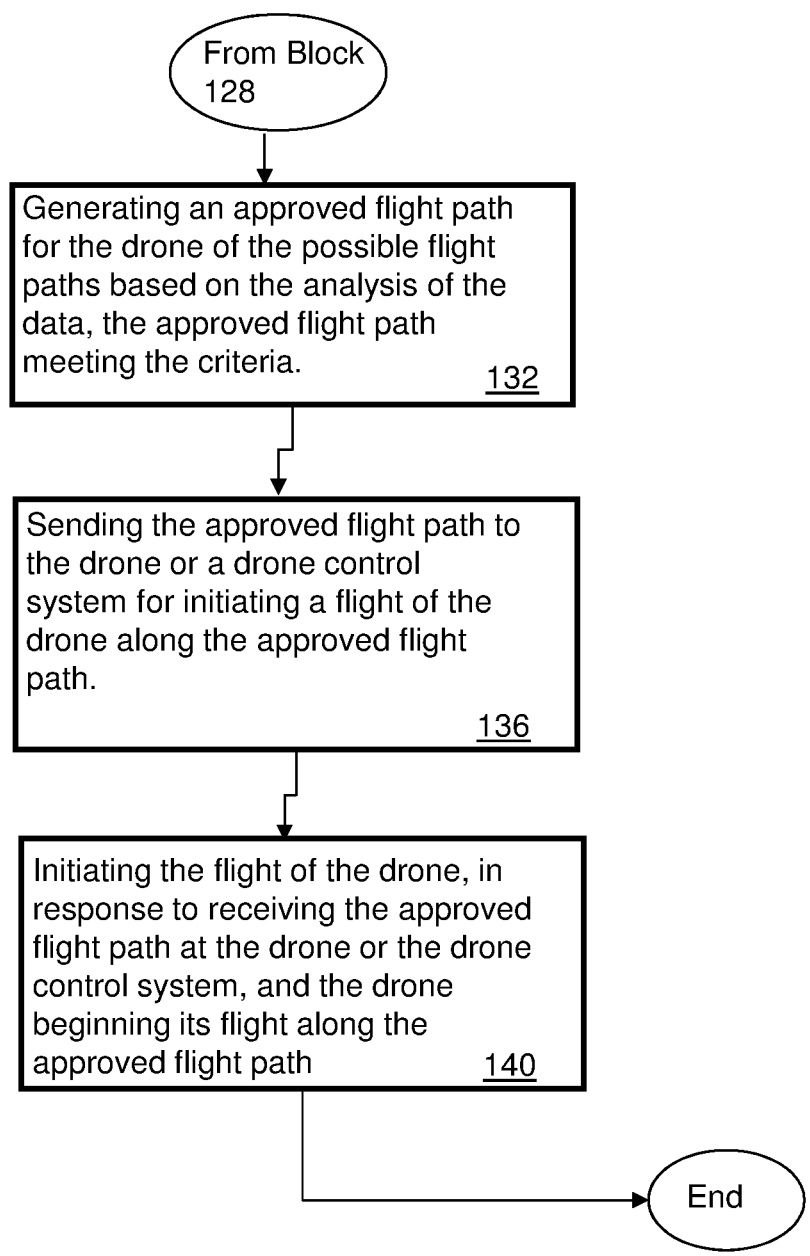
FIG. 3 is a flow chart continuing from the flow chart shown in FIG. 2 depicting a continuation of the method shown in FIG. 2, according to an embodiment of the invention.

Referring to FIGS. 1 and 2, a method 100 (FIG. 2) with reference to a system 10 (FIG. 1) according to an embodiment of the present disclosure is provided for determining a flight path of a drone.

In general, aerial drones, may be precluded, by an appropriate government agency, from flying in excess of a specified amount of feet above the ground, for example, 400 feet above the ground. When a drone flies below the specified amount of feet, such as lower than 400 feet above the ground, a plurality or a patchwork of legal regulations, private property rights, and privacy concerns may apply to properties in the drone's flight path. Other restrictions for drone flights can include security concerns for fly overs, such as populated areas, or events such as sporting events where safety for users on the ground can be more important than allowing drone flights. Further, security concerns can include secrecy or privacy issues for activities taking place on the ground. The embodiments herein can address drone flight below a specified amount by law, where landowner/legal permission is required for flight over a landowner's property.

The method 100 includes receiving, at a computer or a mobile device 20, a request for a flight path 301 (see FIG. 6) for the drone 90 including a start location 302 (see FIG. 6) and a destination 276, as in block 104. The computer or mobile device can include a user device which receives a request for the flight path initiated by a user 14, or for example, a user can include a representative of a corporation. For example, the start and destination locations can be a home location, a business location, a land or parcel or lot location, or a drone depot location, or the like.

The drone can include a computer 92 having a computer readable storage medium 34 and software 94 stored thereon. The software can include a plurality of program instructions executable by a processor 15. Thus, the drone can be programmable, execute instructions, and receive and send communications.

Such a user device can include, for example, a desktop computer, a mobile device, a smart device, etc. In another example, a remote computer, such as a remote computer 72 as part of a control system or a remote server 1100 (FIG. 7), can receive a request for a flight path from a user, wherein the user can use a computer or a mobile device to access a program stored on the remote computer. In another example, the device 20 can include an application 40 stored on a storage medium 34 of the device 20. The application 40, executed by a processor 15 on the device 20, can communicate using a communication network 50, e.g., the Internet, with a control system 70 storing one or more programs 74 on a computer readable storage medium 73 on a computer 72.

Thereby, the method 100 according to an embodiment of the present disclosure, can be incorporated in one or more computer programs or an application 40 stored on an electronic storage medium 34, and executable by the processor 15, as part of the computer on the device 20 associated with one or more users. For example, a user 14 has a device 20, and the device can communicate with the control system 70. Other users (not shown) may have similar devices and communicate with the control system similarly. The application can be stored, all or in part, on a computer or a computer in a mobile device and at a control system communicating with the device, for example, using the communications network 50, such as the Internet. It is envisioned that the application can access all or part of instructions necessary to implement the method of the present disclosure. The program or application can communicate with a remote computer system via a communications network 50 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

Thus, in one example, a control system is in communication with the device(s) 20, and the device 20 can include the application 40. The device 20 communicates with the network 50 and the control system 70 using the communications network 50.

In another example, the control system 70 can have a front-end computer belonging to one or more users, such as the device 20, and a back-end computer embodied as the control system.

Also, referring to FIG. 1, the device 20 can include a computer 22, computer readable storage medium 34, and operating systems, and/or programs, and/or a software application 40, which can include program instructions executable using a processor 15. These features are shown herein in FIG. 1, and also in an embodiment of a computer system shown in FIG. 7 referring to one or more computer systems 1010, which may include one or more generic computer components.

The method including analyzing data 305 (FIG. 6), using the computer, in response to receiving the request for a flight path, and regarding possible flight paths for a drone in relation to a start location and a destination, as in block 108. The data, for example, can include information about one or more drones, start and destination locations, information regarding the start and destination locations, and geographic information regarding possible flight areas.

The data analysis uses criteria or a rule set for analyzing the data and generating possible drone flight paths, or planned drone flight paths, as in block 112. In one example, the analysis can include analyzing the data to determine possible flight paths, and information about possible flight paths, including problems that can occur along a flight path such as obstacles, buildings, regulations, and air rights. In another example, the criteria can include, in general, one or more rules which are to be met when considering possible flight paths for selecting a flight path or a best flight path. Such criteria or one or more rule sets can be stored in a database and updated.

The method includes determining air space accessibility over a plurality of properties, as part of the criteria, the property air space accessibility including property owner permission and authorization for the possible drone flight paths over the properties, respectively, as in block 116. For example, as part of the criteria, the method ascertains ownership of property over which a drone flight path would fly, that is, air space passed through in a flight path. Ownership can be assessed and determined using search tools, for instance searching land ownership records such as a title history or a title report, etc. Permission by a landowner for use of the airspace can be based on user preferences. User preferences can include not allowing drones, or parameters for allowing drones, such as, not allowing drone to fly over at night, or not allowing drones carrying specific payloads, or not allowing drones with a specified noise level.

The method further includes determining legal regulations regarding the possible drone flight paths over locations including the plurality of properties, as part of the criteria, as in block 120. For example, legal regulations can include regulation regarding drone flights and user. Such regulating can include payload restriction, such as banning dangerous substances. Other regulations can include time of day of flights, type of drone, noise levels, flight altitude of drones, and whether cameras are permitted. Further, for example, in the United States, town, county, State and Federal regulations may apply regarding flying drones which can include, the regulations mentioned above as examples, and also fees and/or licenses may apply, and/or registration of drones and/or flight paths. For example, such regulations can be administered by the FAA (Federal Aviation Administration) of United States Department of Transportation. Authorizations for drone flights can also include identifying drones. Identifying a drone may include registering a drone in a database, so that the drone can be authorized for flight.

The method includes analyzing the data regarding the possible or planned flight paths based on the criteria to ascertain when permissions for the possible flight paths are granted including the permissions of the property owners for flying through respective air space over the respective properties on the flight path, as in block 124. In one example, the method can search for property owners of properties effected by a flight path, that is, air space which will be passed through in a possible flight path. For example, the criteria including ascertaining permissions for the possible flight paths can include a contact list for property owners regarding respective air space for a possible flight path. In another example, a database can include property owners for properties. The data base can be updated and expanded as needed over time, thus providing a database for contacting property owners about possible drone flights through respective air space.

The method further including analyzing the data regarding the possible or planned flight paths based on the criteria to ascertain when the legal regulations are met for flying over the location including the respective properties on the possible flight paths, as in block 126. In one example, the method can search for legal regulations for properties effected by a flight path, that is, air space which will be passed through in a possible flight path. For example, the criteria including ascertaining legal regulations, can include legal regulations pertaining to property air space passed through for a proposed flight path. In another example, a database can be populated, and updated and maintained, which can include legal regulation for reference. The database can be updated and expanded as needed over time, thus providing a database for legal regulation for reference when considering possible drone flights through respective air space and the regulation at the respective locations. Such regulations, for example, in the United States, can include town, county, State and Federal regulations administered by the FAA (Federal Aviation Administration) of United States Department of Transportation. Also, fees and/or licenses may apply, and/or registration of drones and/or flight paths.

When the criteria is met in block 128, the method continues to block 132. When the criteria is not met in block 128, the method returns to block 108 to analyze data.

The method includes generating an approved flight path for the drone of the possible flight paths based on the analysis of the data, the approved flight path meeting the criteria, as in block 132. Thus, the method 100 generates the approved flight path based on a possible flight path meeting the criteria. The criteria include, as discussed above, attaining permission from private property owners for permission to travel through air space associated with their respective properties, and in combination or in addition, attaining all legal permissions or meeting all legal requirements, for a flight path through respective air space. The air space being respective to geographic locations passed over in a possible flight path.

The method includes sending the approved flight path to the drone or a drone control system for initiating a flight of the drone along the approved flight path, as in block 136. Thereby, in response to the approved flight path meeting the criteria, the method generates the approved flight path and sends the flight path to a drone or a drone control system. The drone can then proceed to fly the flight path, or the control system can initiate and manage the drone flight path according to flight guidelines.

The method can include initiating the flight of the drone, in response to receiving the approved flight path at the drone or the drone control system, and the drone beginning its flight along the approved flight path, as in block 140.

ADDITIONAL EXAMPLES AND EMBODIMENTS

The method 200 can include a plurality of properties each having a defined parcel of land at a location, that is a geographical location with metes and bounds, and having corresponding air space.

In one embodiment according to the present disclosure, the possible flight paths for the drone are pre-flight, wherein the pre-flight possible flight paths are generated before the drone starts flying along a flight path, that is, before take-off and flight of the drone. In another example, a drone can be re-routed or change flight paths after the drone has started a flight path to a destination. In another example, the drone can be re-routed while in flight, in another example the drone can be re-routed while on its flight route, for example, the drone may have landed for recharging, or maintenance, or for a package drop-off, and be re-routed at that time to continue on a changed flight path from an original flight path.

In one example, the method according to the present disclosure includes using the generated possible flight paths, determining property owners of the properties required for the flight path, and contacting the property owners for permission for a flyover of the drone through airspace associated with the properties, respectively. The method can receive the flyover permissions from the property owners, and use the flyover permissions received from the property owners in the generation of the possible flight paths.

In one embodiment/example, the method can include generating a compensation option for use of the airspace over respective properties of the plurality of properties. The compensation option including consideration for obtaining FAA (Federal Aviation Administration) waivers.

In another example, the method includes using the generated possible flight paths to determine applicable FAA regulations for the locations correlating to the possible flight paths, that is, air space that the drone would fly through on corresponding possible flight paths. The method can include determining accessibility of the possible flight paths over the locations based on the applicable FAA regulations, and using the accessibility over the location in the generation of the possible flight paths.

In another example, the method can include determining, as part of the analysis of when permissions for the possible flight paths are granted, an accessible property of the plurality of properties which allows for recharging the drone. After receiving recharging permission from the accessible property, the method can include negotiating compensation for the recharging service for an owner of the accessible property.

In one example, the method can include using radio frequency, video, and audio communications for ancillary identification and control of the drone.

In another example, the method can include receiving legal regulation data at the computer system, as part of the determining of legal regulation, regarding drone flights and usage. The regulation data can include local, State, and Federal regulations and laws regarding drone flights and usage, and also including FAA (Federal Aviation Administration) regulations.

The method can include determining a shortest flight path of the possible drone flight paths, and selecting the shortest flight path of the possible drone flight paths as the approved flight path.

In another embodiment according to the present disclosure, the method includes analyzing the property air space accessibility and the legal regulation data with respect to the start location and the destination, to generate possible flight paths for the drone through air space with all legal approvals for traveling through the air space along the flight path. The analysis can include checking that air space permissions for all properties passed over in the possible flight paths are received, and checking regulations by the local, state and federal authorities are met for the possible flight paths. The method can include determining a best flight path based on the analysis and the criteria. The best flight path can include a shortest flight path between the start location and the destination, and receiving all flyover permissions from property owners who own the properties and the air space over the properties for the best flight path.

In another example, the method can include generating a second approved flight path, and receiving a selection from a user of a flight path selected from either the approved flight path or the second approved flight path. Then the method includes sending the selected flight path to the drone, or a drone control system.

In another example, the method can include generating another approved flight path in response to additional data being received at the computer, during a flight of the drone on the approved flight path. Thus, the drone can be re-routed during a flight, which can include during actual flight or during a flight path such that, for example, when a drone lands for maintenance or re-charging, the flight path is changed.

In another example, the method can include iteratively generating a plurality of approved flight paths in response to a plurality of instances of additional data being received at the computer, respectively, during a flight of the drone on the approved flight path.

The method can include the computer as part of a control system for controlling the drone in flight along the approved flight path.

In another embodiment according to the present disclosure, the method can include negotiating compensation for the traversing by the drone of an air space of a property of a plurality of properties. The negotiating can include receiving permission for the traversing by the drone of the air space of the property, in response to sending a communication to an owner or manager of the property, and receiving a communication from the landowner regarding approval of the flyover. The method can include communicating an offer of compensation for the traversing by the drone of the air space of the property, and receiving an acceptance of the offer of compensation from the owner or manager of the property.

ANOTHER EMBODIMENT AND EXAMPLES

Figure 4:
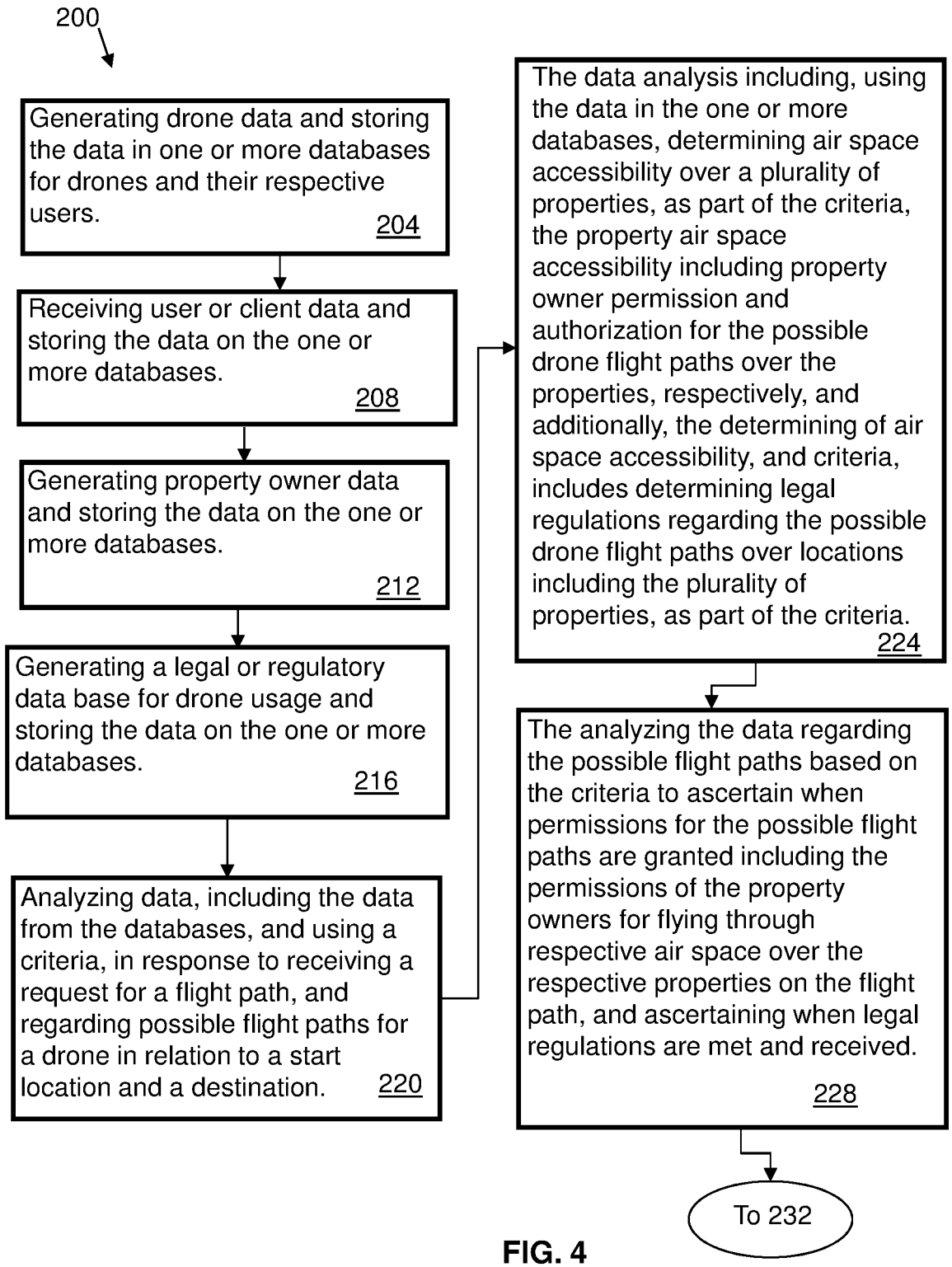
FIG. 4 is a flow chart illustrating another embodiment of a method according to the present disclosure, implemented using the system shown in FIG. 1, for determining a flight path of a drone.
Figure 5:
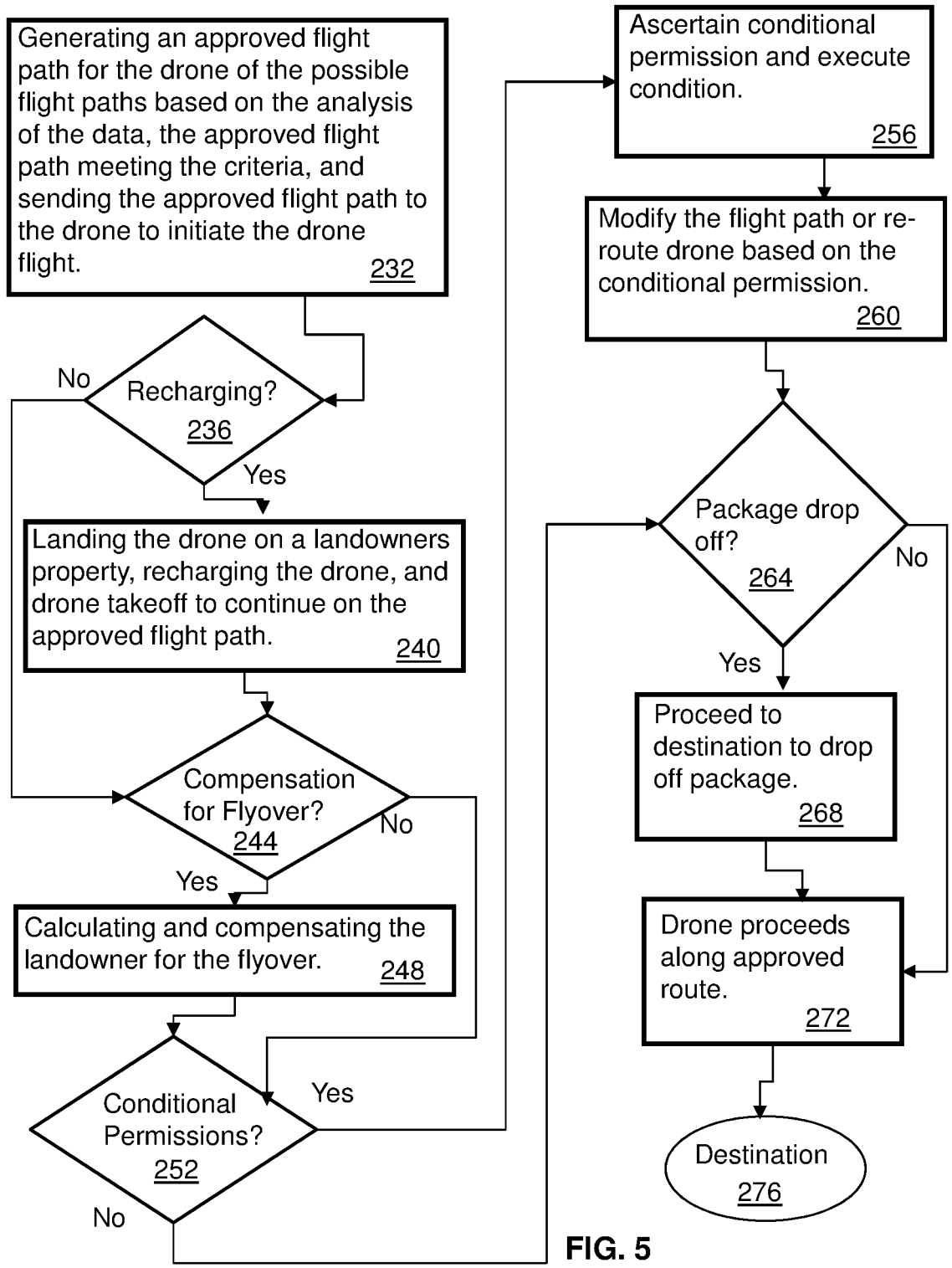
FIG. 5 is a flow chart continuing from the flow chart shown in FIG. 4 depicting a continuation of the method shown in FIG. 4, according to an embodiment of the invention.

Referring to FIGS. 1 and 4, a method 200 (FIG. 4) with reference to a system 10 (FIG. 1) according to another embodiment of the present disclosure is provided for determining a flight path of a drone. The method 200 includes generating drone data and storing the data on one or more databases for drones and their respective users.

The method 200 includes generating drone data and storing the data in one or more databases for drones and their respective users, as in block 204.

The method 200 includes receiving user or client data and storing the data on the one or more databases, as in block 208.

The method 200 includes generating property owner data and storing the data on the one or more databases, as in block 212. Such property owner data can include locations of properties and owner contact information. Further, property owner data can include preferences for each user. Such preferences can include conditional permissions or criteria for allowing or giving permission for use of landowner airspace. For example, a conditional permission can include, allowing flyover during specific times, or not during nighttime hours, or specific drone type conditions, or specific payload conditions, or payload weight conditions. Such examples are intended to be examples and non-exhaustive.

The property owner database can be part of or communicate with the control system and include account data 82 and user profiles 83 as part of user accounts 81 stored on a computer readable storage medium 80. In another example, the landowners or property owners can register or register with user profile in a system, or service, which may use a control system 70 for storing, accessing, and using such user information when determining permissions for flyovers through airspace owned by the user.

The method 200 incudes generating a legal or regulatory data base for drone usage and storing the data on the one or more databases, as in block 216.

The method includes analyzing data 305, using the computer, including the data from the databases discussed above, in response to receiving a request for a flight path, and regarding possible flight paths for a drone in relation to a start location and a destination, as in block 220. The data analysis using criteria for analyzing the data and generating possible, or planned drone flight paths.

The data analysis includes, using the data in the one or more databases, determining air space accessibility over a plurality of properties, as part of the criteria, the property air space accessibility including property owner permission and authorization for the possible drone flight paths over the properties, respectively, as in block 224. Such permission data 308 can be stored in a database for use, and updated and maintained. Additionally, the determining of air space accessibility, and criteria, includes determining legal regulations regarding the possible drone flight paths over locations including the plurality of properties, as part of the criteria, as in block 224. Such legal regulation and data 312 can be stored in one or more databases for use, and updated and maintained.

The method includes analyzing the data regarding the possible flight paths 316 based on the criteria or a rule set 318 to ascertain when permissions for the possible flight paths are granted including the permissions of the property owners for flying through respective air space over the respective properties on the flight path, as in block 228. Additionally, the method includes analyzing the data regarding the possible or planned flight paths based on the criteria to ascertain when the legal regulations are met for flying over the location including the respective properties on the possible flight paths, as in block 228.

The method includes generating an approved flight path 320 (FIG. 6) for the drone of the possible flight paths 316 based on the analysis of the data, the approved flight path meeting the criteria, as in block 232. Additionally, the method includes sending the approved flight path to the drone or a drone control system for initiating a flight of the drone along the approved flight path, as in block 232.

In one embodiment, the drone can be in flight, and re-calculate or re-determine a flight path. In one example, a landowner can have preferences such as no overflight at night, and in another example a landowner can prohibit overflight or prohibit use of airspace above their property 324 when a drone has a noise level above a noise level specified by the landowner. Thereby, permissions by the landowner can be conditional. Such conditional permissions, may include, for example, not allowing drone fly overs or drone flights over a property at night, or if the drone does not meet a noise threshold, or if specified whether conditions exist.

For some conditions, during a lengthy flight, a flight path may have to be changed or a drone flight re-routed during a flight. Such property locations and owners 324 which will allow recharging can be denoted as recharge locations 328.

In one example, such conditional permission can be granted for compensation 332, such as a monetary value. In another example, compensation can include reciprocity of services, such as, in one example, reciprocal fly overs. The reciprocal flyovers can include a landowner who also flies a drone and would allow flyovers for flyovers of another landowner's property by their drone.

The method 200 includes determining when a landowner will allow recharging, that is, permission for recharging, as in block 236. When the landowner give permission for recharging, the method proceeds to block 240 which include landing the drone, recharging the drone, and drone takeoff to proceed on the approved flight path. When the landowner does not give permission for landing the drone and recharging, the method proceeds to block 244.

The method includes determining when a landowner will allow a flyover or flight through a landowner's air space for compensation, as in block 244. Compensation can include, for example, a monetary value, reciprocity of services, compensation for a single flyover or multiple flyovers, or a time period, or compensation for other services in addition to the flyover or flight through the airspace, such as, recharging, maintenance, landing and takeoff for any purposes, etc.

When the landowner requires compensation for a flyover, the method proceeds to block 248 which include calculating and compensating the landowner for the flyover. Such compensating can include negotiating with the landowner and the drone owners for an amount of compensation, and arranging and executing compensation, for example, using a transfer of funds between banks or a payment service. When the landowner does not require compensation for a flyover, the method proceeds to block 252.

The method includes determining when a landowner requires conditional permissions for allowing a flyover or flight through a landowner's air space, as in block 252. A conditional permission can include, for example, specified times of flyovers, noise level requirements for the drone, type of package requirements for the drone, whether the drone can have a camera, or what type of camera if a camera is allowed. When the landowner requires conditional permissions, the method proceeds to block 256 where conditional permissions are ascertained and executed. In this embodiment of the present disclosure, the method proceeds to modify the flight path or re-route the drone based on the conditional permission, as in block 260. For example, the drone may need to be re-routed because of a time restriction baring the drone from a landowner's airspace. However, this is one example, and in other examples, the drone may not need to be re-routed or the flight path modified as the original approve flight path can take into account conditions for flyovers and negotiate compensation and such conditions before a flight and these factors are considered in the approve flight path.

When the landowner does not require conditional permission, the method proceeds to block 264. The method includes determining a package drop off, as in block 264. A package drop-off can include a landowner authorizing a drone carrying a package, the drone landing and dropping off the package, and the drone taking off and resuming a flight route. When a package drop-off or delivery is authorized, the method proceeds to block 268 which includes the drone proceeding to drop off the package. Then, the drone proceeds along its approved route 272 to its destination 276. When a package drop-off is not authorized, the method proceeds to block 272 which includes the drone proceeding along its approved or designated flight route, and finally reaching its destination 276.

In another example, the methods and system according to the present disclosure can include a database which includes smart contracts and can comprise go/no-go transactional database information for drones or Low Altitude Aircraft. For example, compensation for flyover services, or other services such as landing and charging of a drone can be operated as an auction market, resulting in the lowest cost for the user of the drone. For instance, a user can select the lowest price for a flyover or for charging permission for the drone from an optional auction market having a plurality of options for the user to select.

In another example, cloud computing and services can be used for implementation of the methods and systems of the present disclosure, such that a drone can use cloud service for cloud communications. Communications with the drone and the user can include direct visual control, using one or more users, or all or in part, user control of the drone using cloud communications.

Figure 6:
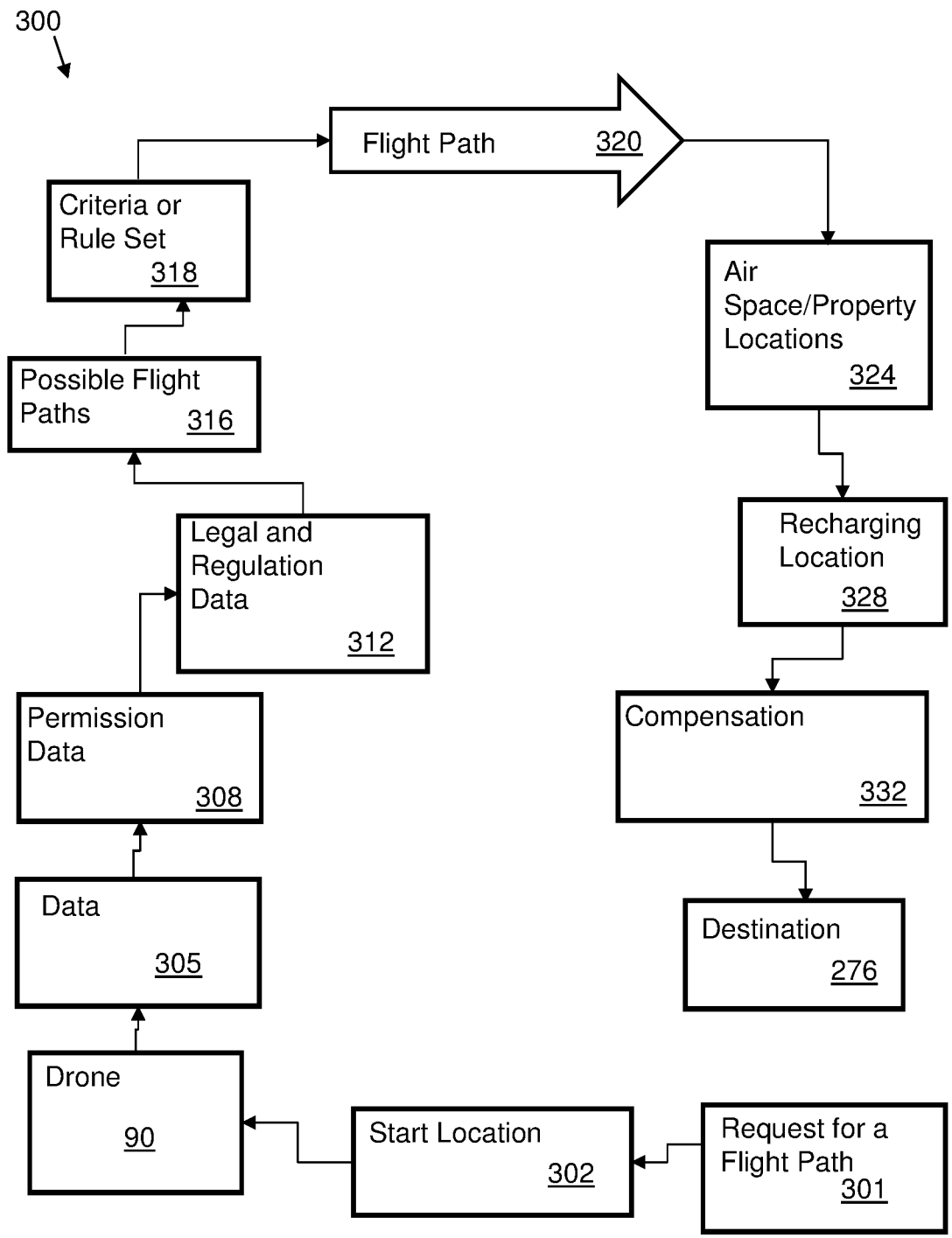
FIG. 6 is a functional schematic block diagram for instructional purposes illustrating features of the present disclosure associated with the embodiments shown in FIGS. 1, 2, 3, 4 and 5, for determining a flight path of a drone, according to embodiments of the invention.

It is understood that the features shown in FIG. 6 are functional representations of features of the present disclosure. Such features are shown in embodiments of the systems and methods of the present disclosure for illustrative purposes to clarify the functionality of features of the present disclosure.

Specifically, regarding the control system 70, the device(s) 20 of one or more users 14 can be in communication with the control system 70 via the communications network 50. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, which also has access to the database 76.

The control system 70 includes a storage medium 80 for maintaining a registration 82 of users and their devices for content analysis 228. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 20 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

In another example, the control system 70 can be all or part of an Artificial Intelligence (AI) system. For example, the control system can be one or more components of an AI system It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Figure 7:
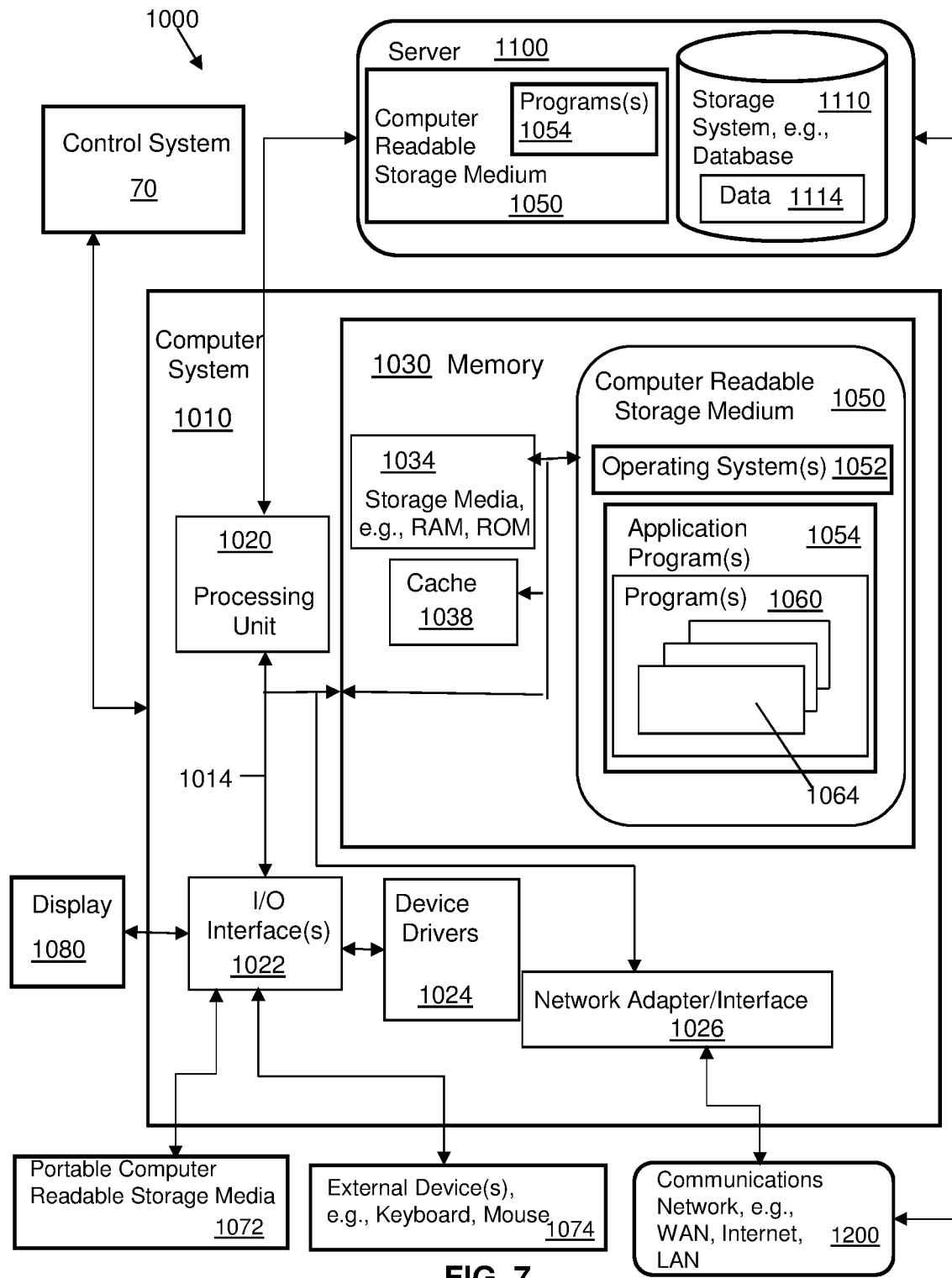
FIG. 7 is a schematic block diagram depicting a computer system according to an embodiment of the disclosure which may be incorporated, all or in part, in one or more computers or devices shown in FIG. 1, and cooperates with the systems and methods shown in FIGS. 1, 2, 3, 4, 5 and 6.

Referring to FIG. 7, a an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 8:
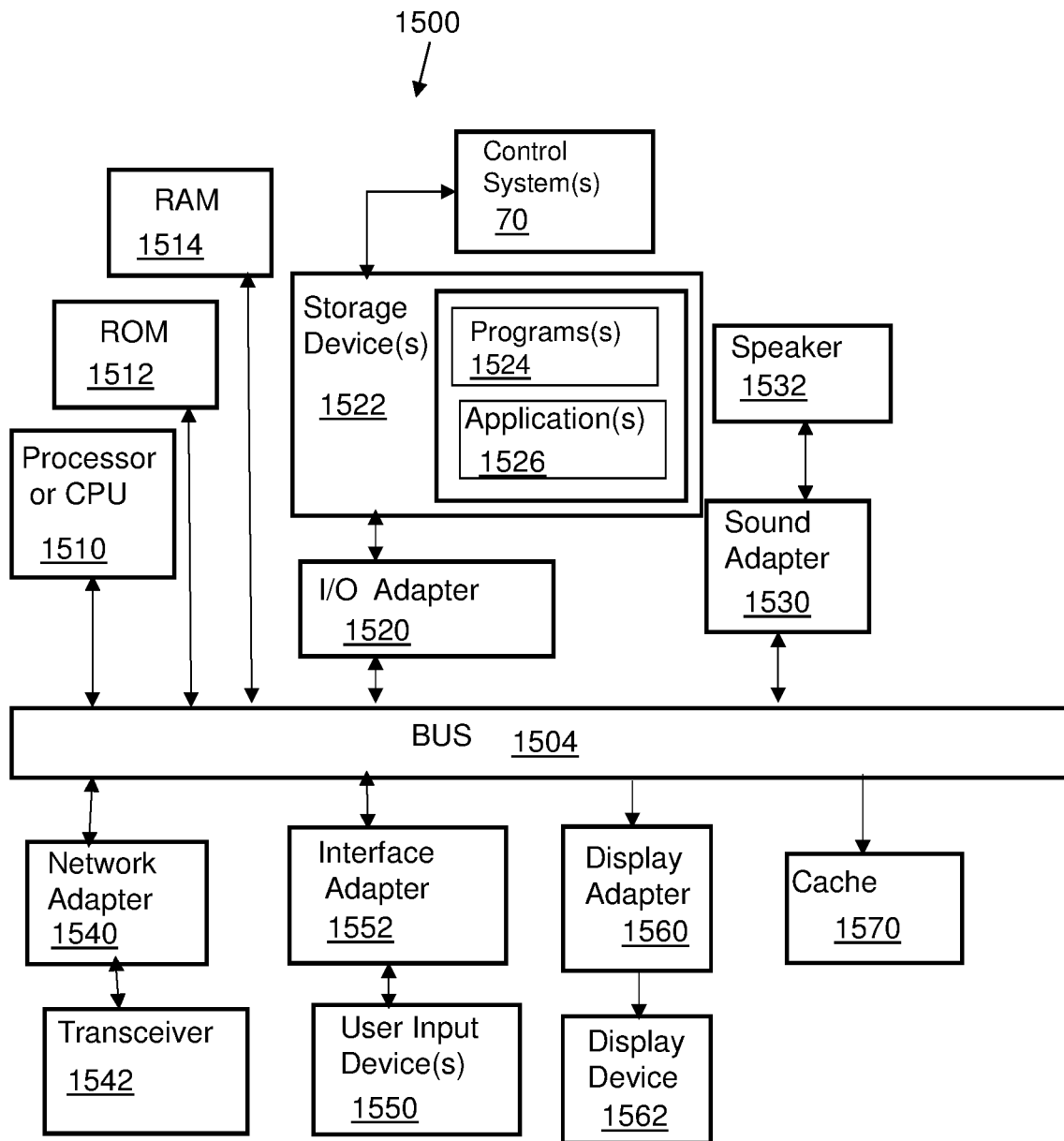
FIG. 8 is a schematic block diagram of a system depicting system components interconnected using a bus. The components for use, in all or in part, with the embodiments of the present disclosure, in accordance with one or more embodiments of the present disclosure.

Referring to FIG. 8, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
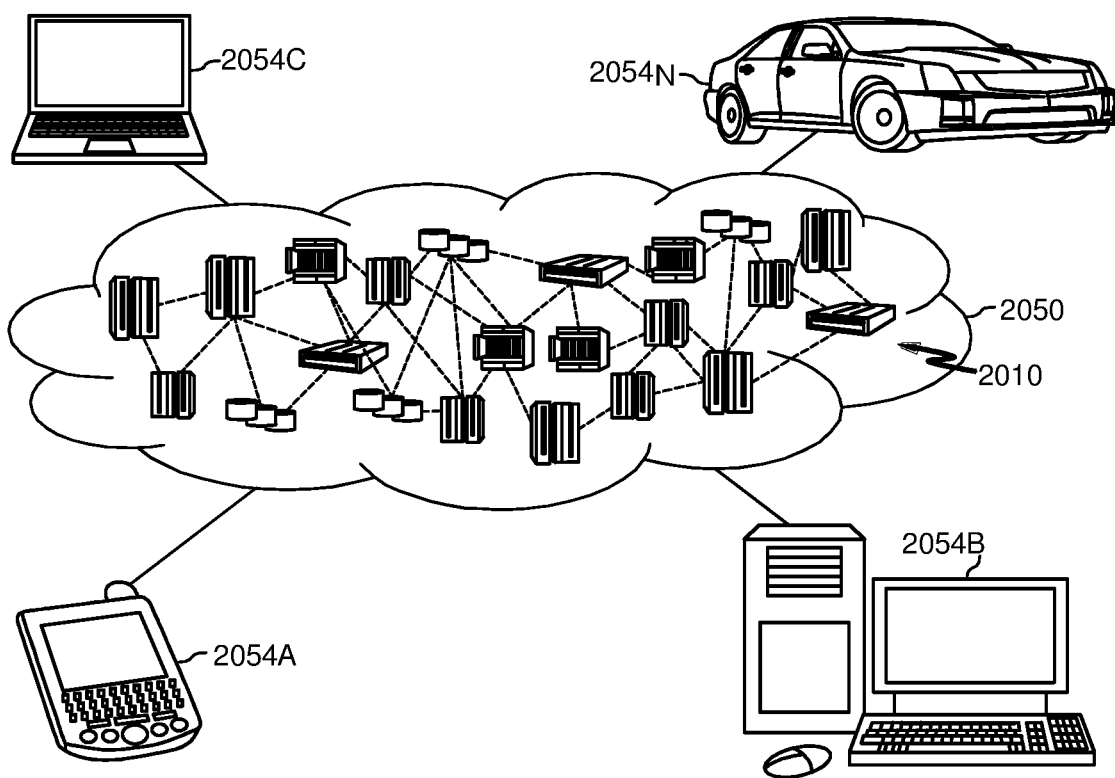
FIG. 9 is a block diagram depicting a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
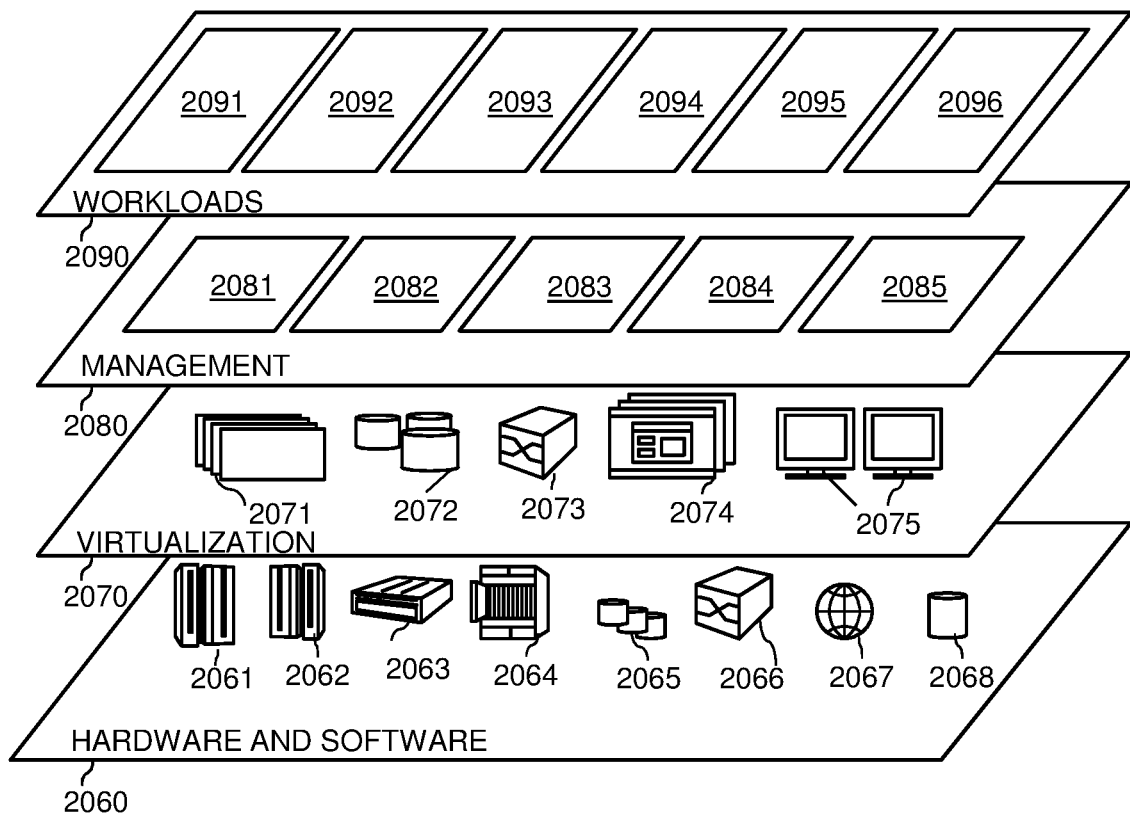
FIG. 10 is a block diagram depicting abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and determining a flight path of a drone 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, using a computer, for determining a flight path of a drone, comprising:
   analyzing, using a computer, data regarding possible flight paths for a drone in relation to a start location and a destination, in response to receiving, at the computer, a request for a flight path for the drone including the start location and the destination, the data analysis using criteria for the possible drone flight paths;

determining air space accessibility over a plurality of properties, as part of the criteria, the property air space accessibility including property owner permission and authorization for the possible drone flight paths over the properties, respectively;

determining legal regulations regarding the possible drone flight paths over locations including the plurality of properties, as part of the criteria;

analyzing the data regarding the possible flight paths based on the criteria to ascertain when permissions for the possible flight paths are granted including the permissions of the property owners for flying through respective air space over the respective properties on the flight path, and when the legal regulations are met for flying over the locations including the respective properties on the possible flight paths;

generating an approved flight path for the drone of the possible flight paths based on the analysis of the data, the approved flight path meeting the criteria;

sending the approved flight path to the drone or a drone control system for initiating a flight of the drone along the approved flight path;

determining, as part of the analysis of when permissions for the possible flight paths are granted, an accessible property of the plurality of properties which allows for recharging the drone;

receiving recharging permission from the accessible property;

negotiating compensation for the recharging service for an owner of the accessible property;

negotiating compensation for the traversing by the drone of an air space of a property of the plurality of properties;

receiving permission for the traversing by the drone of the air space of the property, in response to sending a communication to an owner or manager of the property;

communicating an offer of compensation for the traversing by the drone of the air space of the property;

receiving an acceptance of the offer of compensation from the owner or manager of the property;

using the generated possible flight paths, determining property owners of the properties required for the flight path;

contacting the property owners for permission for a flyover of the drone through airspace associated with the properties, respectively;

receiving the flyover permissions from the property owners; and using the flyover permissions received from the property owners in the generation of the possible flight paths.

2. The method of claim 1, wherein each of the plurality of properties having a defined parcel of land at a location and having corresponding air space.

3. The method of claim 1, wherein the possible flight paths for the drone are pre-flight, wherein the pre-flight possible flight paths are generated before the drone starts flying along a flight path.

4. The method of claim 1, further comprising:
initiating the flight of the drone, and the drone beginning its flight along the approved flight path.

5. The method of claim 1, further comprising:
generating a compensation option for use of the airspace over respective properties of the plurality of properties, the compensation option being in consideration for obtaining FAA (Federal Aviation Administration) waivers.

6. The method of claim 1, further comprising
using the generated possible flight paths, determine applicable FAA regulations for the locations correlating to the possible flight paths;
determining accessibility of the possible flight paths over the locations based on the applicable FAA regulations; and
using the accessibility over the location in the generation of the possible flight paths.

7. The method of claim 1, further including:
using radio frequency, video, and audio communications for ancillary identification and control of the drone.

8. The method of claim 1, further comprising:
receiving legal regulation data at the computer system, as part of the determining of legal regulation, regarding drone flights and usage, the regulation data including local, State, and Federal regulations and laws regarding drone flights and usage, and also including FAA (Federal Aviation Administration) regulations.

9. The method of claim 1, further comprising:
determining a shortest flight path of the possible drone flight paths; and
selecting the shortest flight path of the possible drone flight paths as the approved flight path.

10. The method of claim 1, further comprising:
analyzing the property air space accessibility and the legal regulation data with respect to the start location and the destination to generate possible flight paths for the drone through air space with all legal approvals for traveling through the air space along the flight path, the analysis including, checking that air space permissions for all properties passed over in the possible flight paths are received, and checking regulations by the local, state and federal authorities are met for the possible flight paths; and
determining a best flight path based on the analysis and the criteria, the best flight path including a shortest flight path between the start location and the destination, and receiving all flyover permissions from property owners who own the properties and the air space over the properties for the best flight path.

11. The method of claim 1, further comprising:
generating a second approved flight path;
receiving a selection from a user of a flight path selected from either the approved flight path or the second approved flight path; and
sending the selected flight path to the drone.

12. The method of claim 1, further comprising:
generating another approved flight path in response to additional data being received at the computer, during a flight of the drone on the approved flight path.

13. The method of claim 1, further comprising:
iteratively generating a plurality of approved flight paths in response to a plurality of instances of additional data being received at the computer, respectively, during a flight of the drone on the approved flight path.

14. The method of claim 1, wherein the computer is part of a control system for controlling the drone in flight along the approved flight path.

15. A system for determining a flight path of a drone, which comprises:
a computer system comprising: a computer processor, a computer-readable storage medium, and program instructions stored on the computer-readable storage medium being executable by the processor, to cause the computer system to perform functions, by the computer, comprising, the following functions to:

analyze data regarding possible flight paths for a drone in relation to a start location and a destination, in response to receiving, at the computer, a request for a flight path for the drone including the start location and the destination, the data analysis using criteria for the possible drone flight paths;

determine air space accessibility over a plurality of properties, as part of the criteria, the property air space accessibility including property owner permission and authorization for the possible drone flight paths over the properties, respectively;

determine legal regulations regarding the possible drone flight paths over locations including the plurality of properties, as part of the criteria;

analyze the data regarding the possible flight paths based on the criteria to ascertain when permissions for the possible flight paths are granted including the permissions of the property owners for flying through respective air space over the respective properties on the flight path, and when the legal regulations are met for flying over the locations including the respective properties on the possible flight paths;

generate an approved flight path for the drone of the possible flight paths based on the analysis of the data, the approved flight path meeting the criteria;

send the approved flight path to the drone or a drone control system for initiating a flight of the drone along the approved flight path;

determine, as part of the analysis of when permissions for the possible flight paths are granted, an accessible property of the plurality of properties which allows for recharging the drone;

receive recharging permission from the accessible property;

negotiate compensation for the recharging service for an owner of the accessible property;

negotiate compensation for the traversing by the drone of an air space of a property of the plurality of properties;

receive permission for the traversing by the drone of the air space of the property, in response to sending a communication to an owner or manager of the property;

communicate an offer of compensation for the traversing by the drone of the air space of the property;

receive an acceptance of the offer of compensation from the owner or manager of the property;

using the generated possible flight paths, determine property owners of the properties required for the flight path;

contact the property owners for permission for a flyover of the drone through airspace associated with the properties, respectively;

receive the flyover permissions from the property owners; and use the flyover permissions received from the property owners in the generation of the possible flight paths.

16. The system of claim 15, wherein each of the plurality of properties having a defined parcel of land at a location and having corresponding air space.

17. A computer program product for determining a flight path of a drone, the computer program product comprising a computer readable storage medium having program instructions embodied therewith, the program instructions executable by a computer to cause the computer to perform functions, by the computer, comprising the functions to:

analyze data regarding possible flight paths for a drone in relation to a start location and a destination, in response to receiving, at the computer, a request for a flight path for the drone including the start location and the destination, the data analysis using criteria for the possible drone flight paths;

determine air space accessibility over a plurality of properties, as part of the criteria, the property air space accessibility including property owner permission and authorization for the possible drone flight paths over the properties, respectively;

determine legal regulations regarding the possible drone flight paths over locations including the plurality of properties, as part of the criteria;

analyze the data regarding the possible flight paths based on the criteria to ascertain when permissions for the possible flight paths are granted including the permissions of the property owners for flying through respective air space over the respective properties on the flight path, and when the legal regulations are met for flying over the locations including the respective properties on the possible flight paths;

generate an approved flight path for the drone of the possible flight paths based on the analysis of the data, the approved flight path meeting the criteria;

send the approved flight path to the drone or a drone control system for initiating a flight of the drone along the approved flight path;

determine, as part of the analysis of when permissions for the possible flight paths are granted, an accessible property of the plurality of properties which allows for recharging the drone;

receive recharging permission from the accessible property;

negotiate compensation for the recharging service for an owner of the accessible property;

negotiate compensation for the traversing by the drone of an air space of a property of the plurality of properties;

receive permission for the traversing by the drone of the air space of the property, in response to sending a communication to an owner or manager of the property;

communicate an offer of compensation for the traversing by the drone of the air space of the property;

receive an acceptance of the offer of compensation from the owner or manager of the property;

using the generated possible flight paths, determine property owners of the properties required for the flight path;

contact the property owners for permission for a flyover of the drone through airspace associated with the properties, respectively;

receive the flyover permissions from the property owners; and use the flyover permissions received from the property owners in the generation of the possible flight paths.

\* \* \* \* \*